US008318319B2

(12) United States Patent
Wolf

(10) Patent No.: US 8,318,319 B2
(45) Date of Patent: Nov. 27, 2012

(54) SHAPED ARTICLES WITH BALSA WOOD AND METHOD OF PRODUCING THEM

(75) Inventor: Thomas Wolf, Hochdorf (CH)

(73) Assignee: 3A Technology & Management Ltd., Neuhausen Am Rheinfall (CH)

( * ) Notice: Subject to any disclaimer, the term of this patent is extended or adjusted under 35 U.S.C. 154(b) by 30 days.

(21) Appl. No.: 12/992,313

(22) PCT Filed: May 11, 2009

(86) PCT No.: PCT/EP2009/003316

§ 371 (c)(1), (2), (4) Date: Nov. 12, 2010

(87) PCT Pub. No.: WO2009/138197

PCT Pub. Date: Nov. 19, 2009

(65) Prior Publication Data

US 2011/0064907 A1 Mar. 17, 2011

(30) Foreign Application Priority Data

May 15, 2008 (EP) .................................... 08405135

(51) Int. Cl.
*B32B 21/04* (2006.01)

(52) U.S. Cl. .................................... 428/536; 428/537.1

(58) Field of Classification Search .................. 428/536, 428/537.1

See application file for complete search history.

(56) References Cited

U.S. PATENT DOCUMENTS

| | | | | |
|---|---|---|---|---|
| 2,479,342 | A | 8/1949 | Gibbons et al. | |
| 4,204,900 | A * | 5/1980 | Kohn | 156/255 |
| 4,208,369 | A * | 6/1980 | Kohn | 264/46.5 |
| 4,262,717 | A * | 4/1981 | Kohn | 144/350 |
| 4,301,202 | A * | 11/1981 | Kohn | 428/50 |
| 4,461,666 | A * | 7/1984 | Kohn | 156/222 |
| 4,536,427 | A * | 8/1985 | Kohn | 428/44 |
| 4,568,585 | A * | 2/1986 | Kohn et al. | 428/48 |
| 4,689,257 | A * | 8/1987 | Baum | 428/106 |

FOREIGN PATENT DOCUMENTS

| | | |
|---|---|---|
| DE | 201 08 858 | 8/2001 |
| DE | 20 2007 007516 | 10/2007 |
| EP | 1 792 699 | 6/2007 |
| FR | 1 512 242 | 2/1968 |
| JP | 2001 293706 | 10/2001 |

* cited by examiner

*Primary Examiner* — Leszek Kiliman

(74) *Attorney, Agent, or Firm* — RatnerPrestia

(57) ABSTRACT

Shaped articles made of balsa veneers, balsa chips, balsa strands or balsa strips, which are oriented in the same direction according to their grain direction, and the grain direction of the individual chips deviates by 0° to 30° from the direction of the axis of the grain. The spaces of the adjacent balsa veneers, chips, strands or strips are filled with a, for example foamed, adhesive, the density of which may be the same as or close to the density of the surrounding balsa wood.

16 Claims, 3 Drawing Sheets

SHAPED ARTICLES WITH BALSA WOOD AND METHOD OF PRODUCING THEM

CROSS-REFERENCE TO RELATED APPLICATIONS

This application is a U.S. National Phase Application of PCT International Application PCT/EP2009/003316, filed 11 Mar. 2009 and published 19 Nov. 2009 in German as WO 2009/138197, which claims priority from European Application EP 08405135.8, filed 15 May 2008, each of which is incorporated herein by reference in its entirety for all purposes.

BACKGROUND OF THE INVENTION

The invention relates to shaped articles containing balsa wood and method of producing them.

Balsa wood is a type of wood which is very easy and simple to process. Apart from being used to build floats and as a replacement for cork, balsa wood is used by model builders for aircraft and ship models. However, balsa wood has the greatest significance as the core material of composite materials in a sandwich construction method, for example in boat, ship and yacht construction, in aviation, as in sailplane and small aircraft construction, in space travel and as the core or core material of rotor blades of wind power installations, for example. The good insulating properties of balsa wood are also used for insulation against heat and cold, for example for fuel tanks. In the technical application area, the low volume weight and the unusually high compressive strength parallel to the grain direction in relation to the low gross weight are utilised.

A so-called centre layer material is produced for the applications mentioned. The basic component produced for this is the so-called cross-cut wood panel. For this purpose, balsa boards machined on four sides, also called squared wood or balsa squares are glued to form large blocks, for example with a cross-section of about 600×1,200 mm and then sawed transverse to the grain direction to form panels of any thickness, for example about 5 to 50 mm, and then sanded to the precise thickness size. This light cross-cut wood panel can absorb very strong compressive forces over the area, but is intrinsically very unstable. Highly loadable composite materials are obtained, for example, by the application, on one or both sides, transverse to the grain direction, of plastics material panels, plastics material panels or layers reinforced with glass, plastic or carbon fibres, metal panels or sheets, wood panels, veneers, woven fabrics, foils etc. onto the centre layer material or a cross-cut wood panel.

To construct highly curved components, such as, for example, in the production of hulls for boats or sailing yachts, a thin fibre which is nonwoven, knitted fabric or woven fabric glued to the cross-cut wood panel on one side and the cross-cut wood panel is scored from the opposite side in a right parallelepiped or cuboid shape through to a thin web. The panel which is prepared in this manner can be made into any concave or convex shape and can be adapted to a curved shape, such as that of a boat or float or a spherical tank.

Balsa wood is a natural product. Therefore, the properties of the balsa wood may change within the wood of one harvest or even in sections from a trunk of one tree. In relation to this, for example, the bulk density, the shrinkage, the compressive strength, the tensile strength etc., and the pore content may vary. Defective locations in the trunks, such as internal cracks, so-called red heartwood or water core, grain tangles or mineral specks, if not removed in time with loss of wood, can influence the regularity of the properties of a cross-cut wood panel.

As a balsa wood trunk is round, but the cross-cut wood panel to be produced therefrom is produced from a large number of rectangular boards, the trunk has to be sawn in the grain direction or course of the grain, and transversely thereto. The sawn boards are tightly stacked, pressed by means of the mutual contact faces and glued and then sawn again transverse to the grain direction. By peeling off the tree bark, sawing off the rounded parts by a chordal or tangential cut and sawing into panels or boards, only about 25% of the available wood is utilised for technical use. The remainder accumulates as chips, cuttings and sawdust.

SUMMARY OF THE INVENTION

The invention is based on the object of using the wood better and describing shaped articles containing balsa wood with at least approximately the same or better properties than the natural balsa wood and proposing a method for the efficient production thereof.

The fact that the shaped article contains balsa veneers, balsa chips, balsa strands or balsa strips oriented in the same direction with respect to the grain direction and adhesives between the balsa chips, balsa strands or balsa strips leads to the achievement of the object according to the invention.

The balsa veneers, balsa chips, balsa strands or balsa strips are in particular oriented according to their grain direction or grain course and the grain direction of the individual chips may deviate by 0° to 30°, expediently 0° to 10° and preferably by 0° to 3°, from an axis in the direction of the grain. Ideally, the deviation of the grain direction of the individual balsa veneers, balsa chips, balsa strands or balsa strips is as close as possible to 0° (angle degree) from an axis in the direction of the grain. In other words, the grain direction of all the balsa chips, balsa strands or balsa strips in the shaped article should be, as far as possible, parallel and not deviate by more than 30° from the axis in the grain direction. The direction of the extended and straight wood grains, which extend in the growth direction of the trunk, is meant by the grain direction or grain course.

DETAILED DESCRIPTION OF THE INVENTION

Figure 1:
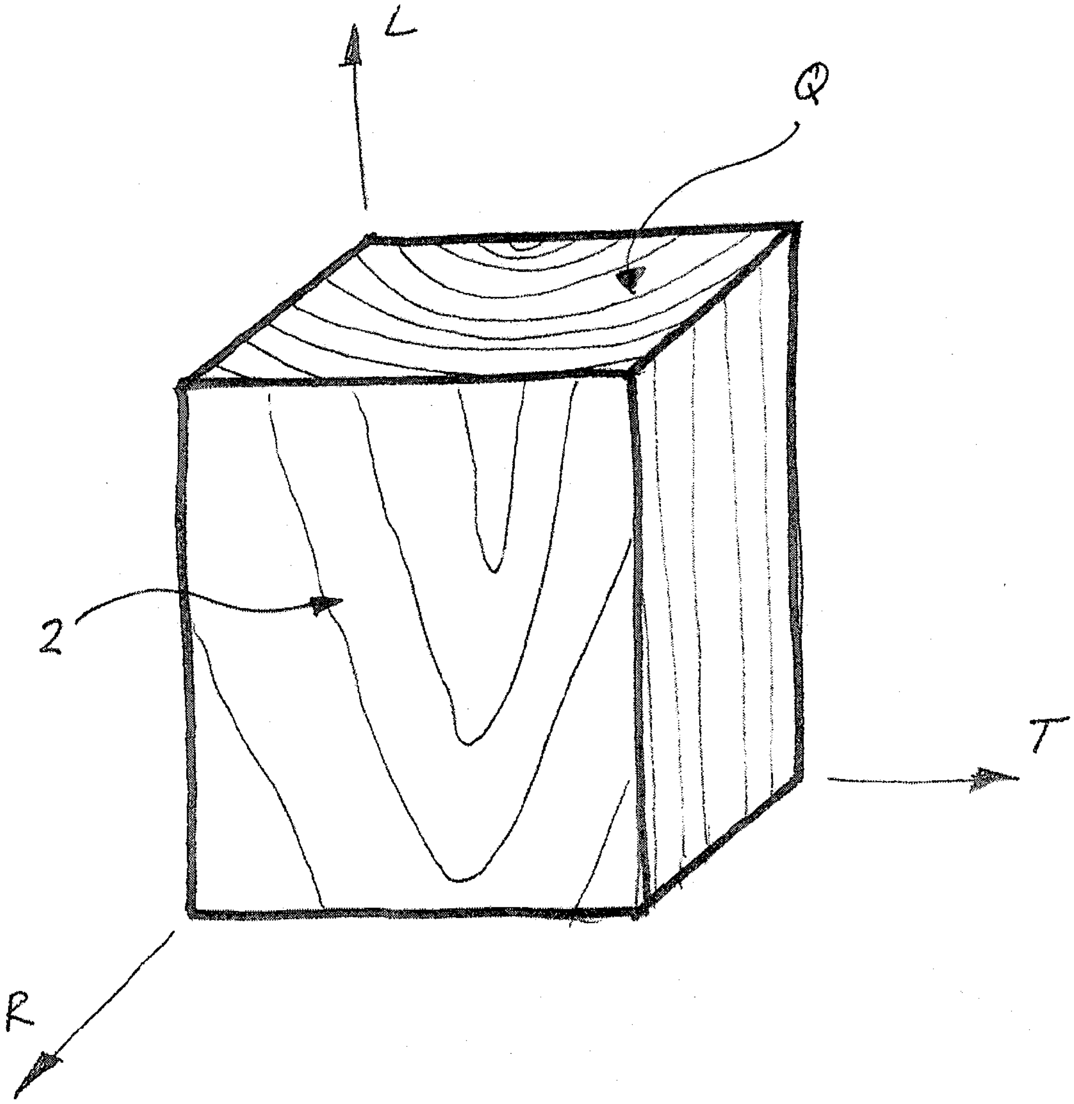
FIG. 1 illustrates a board or section of a balsa wood trunk.

In individual cases, mixtures of balsa chips, balsa strands and/or balsa strips may be contained simultaneously in the shaped articles according to the invention.

The veneers, chips, strands or strips of balsa wood are obtained from trunks, the wood of which, for example, has a density of 0.07 to 0.25 g/cm$^3$. Soft balsa wood has a density of 0.07 to 0.125 g/cm$^3$, medium hard balsa wood has a density of 0.125 to 0.175 g/cm$^3$ and hard balsa wood has a density of 0.175 to 0.25 g/cm$^3$.

The present invention also relates to shaped articles made of balsa veneers, balsa chips, balsa strands or balsa strips which are oriented according to their grain direction and the balsa grains are severed transversely at two opposing surfaces of the shaped article.

The size of the individual chips for longitudinal chips may, for example, be from 40 to 400 mm with respect to their length, 4 to 40 mm with respect to their width and 0.3 to 2 mm with respect to their thickness. Accumulating chips from the processing of balsa wood panels, for example, also cross-cut wood panels, may have a length of, for example, 10 to 50 mm, a width of 10 to 30 mm and 1 to 4 mm with respect to thickness.

The balsa wood residues accumulating during the processing of trunks to form boards are used, for example, as chips, as are residues which accumulate during the sawing or cutting to length of the trunks or boards. However, the chips are preferably produced by the peeling processing of trunks or sections of trunks. For this purpose, the trunks or sections of trunks are processed, for example, in a ring chipper or blade ring chipper. The trunks are conveyed by way of a loading station to the cutting room. Swords which are arranged in the cutting room hold the trunks in position during the chipping stroke. The wood is chipped parallel to the grain, so rectangular chips with a smooth surface are produced with a very low fine material content. The long thin flat chips called "strands", which are peeled or cut tangentially with respect to the trunk diameter are also included in the chips which are preferably used in the present invention. Elongate strands, for example, have a length of 10 to 15 cm, a width of 2 to 3 cm and a thickness of 0.5 to 0.8 mm. Furthermore, split parts, i.e. chips produced by splitting, can also be used.

The chips or strands are generally produced from fresh round wood and, after chipping, the chips are advantageously dried in a drum dryer. The chips can then be sieved and screened by sieving and screening according to size and density and stored in individual cases. The chips are, in particular, provided with glue. For this purpose, the chips are uniformly coated with the provided quantity of glue by pre-coating or direct coating, for example in a gluing drum, by spraying, scattering in or dusting and mixing or by immersion. The chips which are provided with glue—mixed, in individual cases, from fractions of different density and/or size—may be processed into shaped articles. In general, the chips which are provided with glue are scattered or poured onto a shaping line and, as required, oriented in a grain direction which is as parallel as possible by measures, such as vibration, shaking, sieving in the airflow etc. The pouring can be carried out discontinuously on a table, but is preferably carried out on a continuously running belt. The edges may be seamed and a provisional thickness determined by coating with a doctor knife or between rollers. The bulk product on the belt can then run through a pressing device, such as pairs of rollers, a belt press etc., a pre-compression of the chips which are poured on taking place. The adhesive is then activated, for example, in a continuous furnace and/or a double band press or a heated continuous press, the adhesive being foamed, melted, chemically reacted etc., in accordance with the adhesive and the chips being non-separably glued to one another. Owing to the viscous behaviour of the adhesive or owing to the foaming process, the adhesive can arrive in the spaces between the chips and partly and advantageously completely fill up the spaces or adhesive joints. Boards are produced from glued together chips or strands. One side edge of this board depends on the apparatus situation and the extent thereof may, for example, be from 10 cm, advantageously from 50 cm, up to 300 cm. The second side edge may extend, for example, from 1 cm, advantageously from 50 cm, up to 300 cm, 10 cm to 15 cm being particularly preferred. As the boards can be continuously produced, the length thereof can be adjusted as desired. For practical reasons of further processing, the length is generally from 100 cm to 300 cm. The boards can be fabricated with precisely determinable side edges and any length, i.e. the boards can be manufactured true to size and with the same grain direction, layered in stacks and glued to each other. From the stacks with the same grain direction, the shaped articles according to the invention, such as cross-cut wood panels, can be separated transversely to the grain direction, such as by sawing or cutting off.

In a similar procedure, the trunks can be processed by a tangential cut, for example in the form of a veneer peeling machine into thin wood layers, so-called veneers. After a drying step, the wood layers can be cut into balsa strips. The length of the individual strips may, for example, be from 50 mm to 1,000 mm, expediently up to 500 mm and advantageously up to 300 mm. The width of the individual strips may be from 10 mm to 1,000 mm and the thickness from 0.3 mm to 10 mm. The strips are further processed like the chips, i.e. the strips are in particular provided with glue. For this purpose, the chips are coated, for example with the provided quantity of adhesive on all sides by spraying, brushing on or dusting. The strips which are provided with glue—mixed, in individual cases, from fractions of various densities and/or wood quality—may be processed into shaped articles. Generally, the strips which are provided with glue, are layered on a shaping line and oriented as required by measures, such as vibration, shaking etc., in a grain direction which is parallel or as far as possible in the same direction on a table and preferably continuously running belt. By lateral pressure by rollers or jaws and optionally vertical pressure by a doctor blade, belt, double belt or rollers, optionally with simultaneous heating, the adhesive is activated, the latter being foamed, melted, chemically reacted etc., in accordance with the adhesive and the strips being non-separably glued to one another to form a shaped article in a panel shape. The width of the panels depends on the apparatus situation and may, for example, be from 50 cm to 300 cm. As the panels can be continuously manufactured, the length thereof can be adjusted as desired. For practical reasons, the length is from 100 cm to 500 cm. The panels, for example in a thickness of 2 cm to 30 cm, can be layered one above the other with the same grain direction and glued to one another, a block, for example of 2 to 20 panels layered one above the other being produced. The desired shaped articles, such as cross-cut panels, for example with a thickness of 0.5 to 5 cm can be separated, such as sawn off or cut off, from this block transverse to the grain direction.

In another procedure described above, the trunks can be processed, for example by a tangential cut, in a veneer peeling machine into thin wood layers and accordingly processed into balsa veneers in the form of veneer sheets; wood sheets, peeling veneers, or veneers are also suitable. The veneer sheets as such are coated with the provided quantity of adhesive on all sides by spraying, brushing on or dusting. The veneer sheets which are provided with glue—mixed, in individual cases, from fractions of different density and/or wood quality—can be layered to form shaped articles. Generally, the veneer sheets which are provided with glue are layered in the same grain direction to form a block. By means of pressure and/or temperature but without an external action of pressure or action of temperature, the adhesive can be activated, the adhesive being foamed, melted, chemically reacted etc., in accordance with the adhesive and the veneer sheets being non-separably glued to one another to form a shaped article in block form. The side edge length of the veneer sheets depends on the apparatus situation and can, for example, be from 50 cm to 300 cm. For practical reasons, the length is from 100 cm to 250 cm. The veneer sheets, for example in a thickness of 0.1 cm to 3 cm, are layered or stacked on top of one another with the same grain direction, the stack height not being critical and being able to be, for example, from 5 cm to 250 cm. The veneer sheets are glued to form a block by means of adhesive between the veneer sheets. A block can be produced, for example, from 2 to 2,000 veneer sheets which are layered and glued one above the other. The desired shaped articles, such as cross-cut wood panels, for example with a thickness of 0.5 to 5 cm can be separated off from this block transverse to the grain direction, such as sawn off or cut off. The veneer sheets may, for example, be connected to one another, for example, with a casein glue, in particular a polyvinyl acetate-containing glue, a urea glue, a PUR-containing adhesive or a foaming PUR-containing adhesive. The adhesion can take place, in individual cases, only in a shape-retaining manner, i.e. without the application of an external pressure. A foaming PUR-containing adhesive may act both as an adhesive and as a filler between the veneer sheets. In a further embodiment for specific application purposes, as stated above, blocks can be produced and two or more blocks or two or more individual veneers or veneers alternating with blocks, can be rotated, in each case, through, for example, 90° with respect to the grain direction, stacked and glued.

During the processing, the pressure which is applied should be selected by lateral pressure by rollers or jaws and vertical pressure by a belt, double belt or rollers in such a way that the cell or grain structure of the balsa wood is not changed or damaged, in particular in that the density of the balsa wood is not changed or only slightly by compression. The pressing pressure should be adjusted to be low as, with too high a pressing pressure, the wood structure is also compressed as a whole. The pressure applied between two rollers and/or belts may be 50 bar, expediently 0.5 to 5 bar.

In another manner, the veneers, chips, strands or strips can be provided with glue and poured into a predetermined mould with a grain direction which is parallel as far as possible and, in individual cases, the mould closed. In accordance with the adhesive used, the adhesion can take place with or without the application of pressure and the adhesive can react, set or harden without or by the application of heat. If a foaming adhesive is used, the chips and the foam can fill the mould and shaped articles can be produced in accordance with the selected mould. The chips are preferably provided with a two-component PUR glue, the chips which are provided with glue with the same grain direction are poured into the predetermined mould and the mould is closed. Upon the reaction and foaming of the adhesive, the spaces between the chips are filled and also the inner contours of the mould are reproduced by the foam with the chips which are received therein. The mould is substantially completely filled by volume expansion. A mould which is closed in all three dimensions can be used as the mould. It is also possible to produce shaped articles, the cross-sectional design of which is predetermined by a mould and, with regard to the third dimension, the shaped articles are produced continuously or endlessly, for example on a belt or between two belts.

Adhesives, such as physically setting adhesives or chemically hardening adhesives can be used, for example, as the adhesive. Examples are one-component or two-component polyurethane adhesives, one-component or two-component epoxy resin adhesives, phenoplastics, such as phenol-formaldehyde adhesives, urea-containing glues, melamine urea phenol formaldehyde adhesives, isocyanate adhesives, polyisocyanates, such as polymeric diphenylmethane diisocyanate, cyanacrylate adhesives, acrylic resin adhesive, methylmethacrylate adhesive, hot-melt adhesives, wood resin, casein glue, in particular containing polyvinyl acetate, etc. Foaming adhesives or foam adhesives and, in this case, in particular foaming or foamed polyurethane-containing adhesives are preferably used. Adhesives such as 2-component adhesives, in particular foaming adhesives, for example based on PUR, or 1-component adhesives, in particular foaming adhesives, for example based on PUR, for example ones which react under the influence of moisture, can be used. The moisture required for reaction may, for example, be provided by the wood moisture alone or by moistening the wood. The adhesives can react, set or harden under the influence of heat. The adhesives can react, set or harden under pressure. Or, the adhesives can react, set or harden under the influence of heat and pressure. Adhesives which react, harden or set without heat are favourable, accordingly those which allow a cold hardening or so-called "cold curing". Adhesives are also favourable which react, set or harden without externally applied pressure. As mentioned above, owing to the viscous behaviour of the adhesive or owing to the foaming process, the adhesive can arrive in the spaces or adhesive joints between the chips or at the mutual support faces or adhesive joints of the strips, and partially and advantageously completely fill up pores, cavities or gaps located in between and provide a non-separable connection. In particular, PUR foams acting in this manner are both fillers between the chips and adhesive to connect the chips.

The shaped articles contain a wood and an adhesive fraction. The wood fraction of a shaped article may, for example, be from 60 to 95% by volume. The adhesive, which may also be foamed, is advantageously present in fractions of 1 to 40% by volume. Generally, the adhesive is present in fractions of 1 to 15% by volume, expediently 2 to 10% by volume and preferably 3 to 5% by volume based on the volume of the shaped article.

The fully reacted, i.e. foamed or set etc., adhesive may have densities or volume weights of 50 kg/m$^3$ to 300 Kg/m$^3$. In particular foamed adhesives advantageously have a volume weight of 50 kg/m$^3$ to 240 kg/m$^3$.

The fully reacted, i.e. foamed or set etc., adhesive preferably has the same or approximately the same density as the density of the surrounding balsa wood. The fully reacted adhesive, based on the density of the balsa wood surrounding the adhesive, may for example have a density which is 0 to 20% by weight higher or 0 to 20% by weight lower. Adhesives with densities of the fully reacted adhesive, which are 0 to 10% by weight above or 0 to 10% by weight below the density of the surrounding balsa wood, are preferred. Foamed polyurethane adhesives are particularly suitable as adhesives with densities in the given range. The density in foamed adhesives is taken to mean their volume weight. Thus, the advantageous low density of the balsa wood can also be achieved with shaped articles according to the invention.

As the balsa wood which is preferably processed into the shaped articles is a natural product, depending on the type of plant, site or growth influences etc., it has different densities or volume weights. The selection preferably falls in the present case to wood with densities of about 80 to 200 kg/m$^3$. With regard to the shaped articles according to the present invention, a volume weight of, for example, less than 160 kg/m$^3$ is advantageous in practical application. Favourable volume weights are 80 to 160 kg/m$^3$ and the volume weights are advantageously 100 to 140 kg/m$^3$ and, in particular, 120 kg/m$^3$. In order to obtain the desired volume weight for a shaped article, as one measure, the veneers, chips, strands or strips of wood of different density can be mixed. A further measure is the selection of the adhesive taking into account the density thereof. In the case of foaming adhesives, the density thereof can be taken into account and the degree of foaming influenced in order to influence the volume weight of the shaped article. The measures can also be combined.

The present invention also relates to a method for producing the shaped articles from veneers, balsa chips, balsa strands, balsa strips etc., which are mixed with adhesive and oriented with respect to the grain direction, the grain direction of the individual chips deviating by 0° to 30°, expediently 0° to 10° and preferably by 0° to 3°, from the axis in the grain direction, the adhesive being activated and solidified with the formation of adhesive force. The formation of adhesive force, or the solidification, can take place at room temperature, so-called "cold curing", by heat and/or pressure. In an expedient embodiment for producing the shaped articles according to the invention, the balsa chips, balsa strands, balsa strips etc., are solidified in a double belt press. A method for producing the shaped articles is preferred, in which adhesive is used in fractions of 1 to 40% by volume, expediently from 1 to 15% by volume, particularly expediently 2 to 10% by volume and preferably 3 to 5% by volume, based on the volume of the shaped article.

The method for producing the shaped articles can be carried out in such a way that veneers, balsa chips, balsa strands, balsa strips etc., are mixed with adhesive and orientated in the same grain direction, the grain direction of the individual chips deviating by 0° to 30°, expediently 0° to 10° and preferably by 0° to 3°, from the axis in the grain direction, the adhesive being activated and solidified with the formation of adhesive force to form an article and the shaped articles, such as cross-cut wood panels being separated therefrom, by separation by means of cuts transverse to the grain direction.

The shaped articles are, for example, beams, boards, or panels, which can now be divided transversely to the grain direction into, for example, cross-cut wood panels. A large number of veneer sheets, beams or boards, which usually have a polygonal, in particular rectangular cross-section, can also be stacked, glued to one another and divided transversely to the grain direction into cross-cut wood panels, such as cut off, sawn etc., to form blocks with a grain in the same direction or substantially parallel grain direction. If the method is carried out in such a way that, instead of beams or boards, the shaped articles are produced as panels, the panels can be stacked to form blocks and glued together. The grain course or the grain direction in the panel block is in the same direction and, transverse to the grain direction, the cross-cut wood panels can be separated from the block.

The shaped articles which are obtained according to the invention, such as cross-cut wood panels, can be used in the same manner as the previously manufactured panels. For example, highly loadable composite materials are obtained by application on one or both sides, transverse to the grain direction, of plastics material panels, of plastics material panels or layers reinforced with glass, plastic or carbon fibres, metal panels or sheets, wood panels, veneers, woven fabrics, knitted fabrics, interlaced fabrics, nonwovens, foils etc., onto the centre layer material or a cross-cut wood panel. The shaped articles according to the invention, in particular cross-cut wood panels, can have fibre which is nonwoven, knitted fabrics, interlaced fabrics or woven fabrics glued on one side and can be scored from the other side in a parallelepiped or cuboid shape through to a small residual thickness in the direction of the grain. The panel which is processed in this manner thus becomes flexible and can be made into a concave or convex shape.

It is possible to use the balsa wood to a much greater extent for shaped articles, such as cross-cut wood panels, than was previously possible, using the present invention. Proceeding from the harvested balsa wood, through to a cross-cut wood panel, a yield of only 24% can be achieved in conventional methods. Losses in the saw mills occur during the production of balsa boards or squared wood, during the subsequent drying, during the layering and adhesion of blocks and finally during the sawing. Using the present invention, a yield of 60 to 70% is achieved. In particular, virtually all the parts of the balsa trunk can be utilised, at least as long as the parts can still be oriented according to their grain direction or the trunks can be peeled without waste or with extremely low waste and the peeling products completely utilised.

Balsa wood can be glued very well and in a lasting manner. The strength of the adhesive joints may be the strength of the surrounding xylem, may be less or may exceed it. Depending on the selection of the adhesive, the properties of the cross-cut wood or of balsa wood parts can be changed. The adhesive in the adhesive joints may, for example, also form an actual support structure or a supporting network, which can lead to still more pressure and/or tear-resistant materials or the adhesive can reduce or increase the elasticity of a balsa wood part. The adhesive joints may also contain reinforcing materials, such as fibres, for example as a component of the adhesive.

The shaped articles according to the invention can be used in many ways. For example, they are starting products or finished products in the area of layered materials, sandwich materials or so-called composites. In the energy production area, the shaped articles may form parts of rotors, propellers and vanes of windmills or wind-driven generators or turbines, in particular cores or core materials in vanes, rotors or blades or turbine blades. Favourable volume weights for the cores or core materials for said purposes are 80 to 160 kg/m$^3$ and the volume weights are advantageously 100 to 140 kg/m$^3$ and, in particular 120 kg/m$^3$. The shaped articles can be used, for example, as core materials or layered materials in transport means, such as ceilings, floors, intermediate floors, wall linings, coverings etc., in boats, ships, buses, lorries, rail vehicles etc. Owing to the low density of the shaped articles, the latter can be used as a replacement for conventional lightweight construction and core materials, such as honeycomb articles, foams etc.

The present invention will be illustrated by way of example with the aid of FIGS. 1 to 4.

FIG. 1 shows a board or section of a balsa wood trunk (2). The arrow (L) points in the longitudinal direction, which corresponds to the growth direction and therefore the grain direction. Arrow (L) also represents the axis of the grain direction. Q is the cross-sectional area, i.e. the cut transverse to the grain direction. Arrow (R) points in the direction of the radial cut face. Arrow (T) points in the direction of the tangential cut face.

Figure 2:
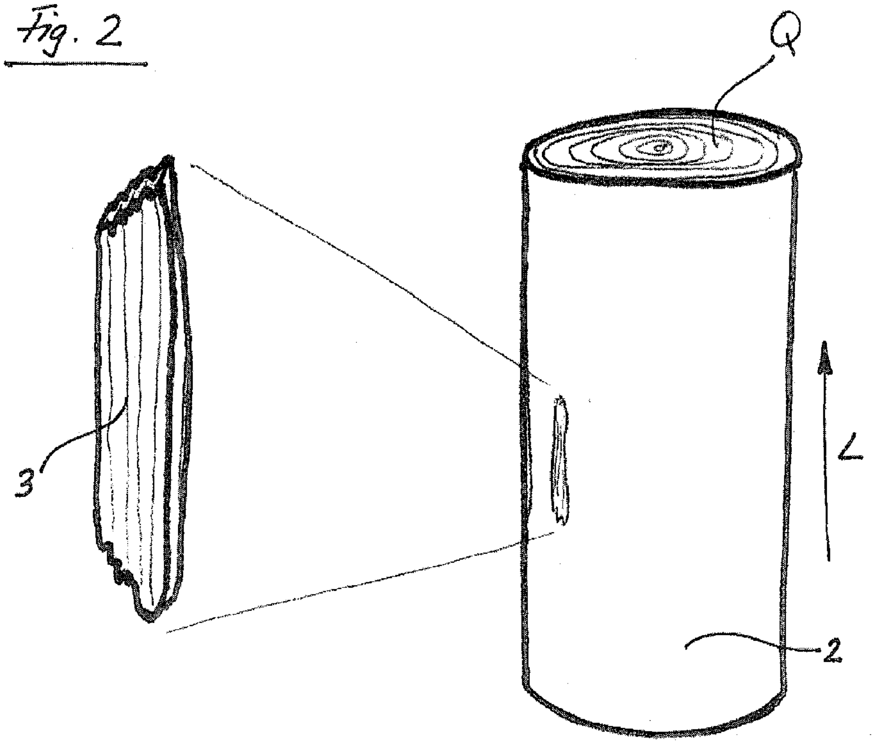
FIG. 2 illustrates a portion of a balsa wood trunk.

FIG. 2 shows a portion of a balsa wood trunk (2). The arrow (L) points in the longitudinal direction, which corresponds to the growth direction and therefore the grain direction. Thus, arrow (L) also represents the axis of the grain direction. Q is the cross-sectional area. A chip (3) is removed in a sketched manner from the trunk (2). The grain direction in the chip (3) accordingly also runs in the direction of the arrow (L).

Figure 3:
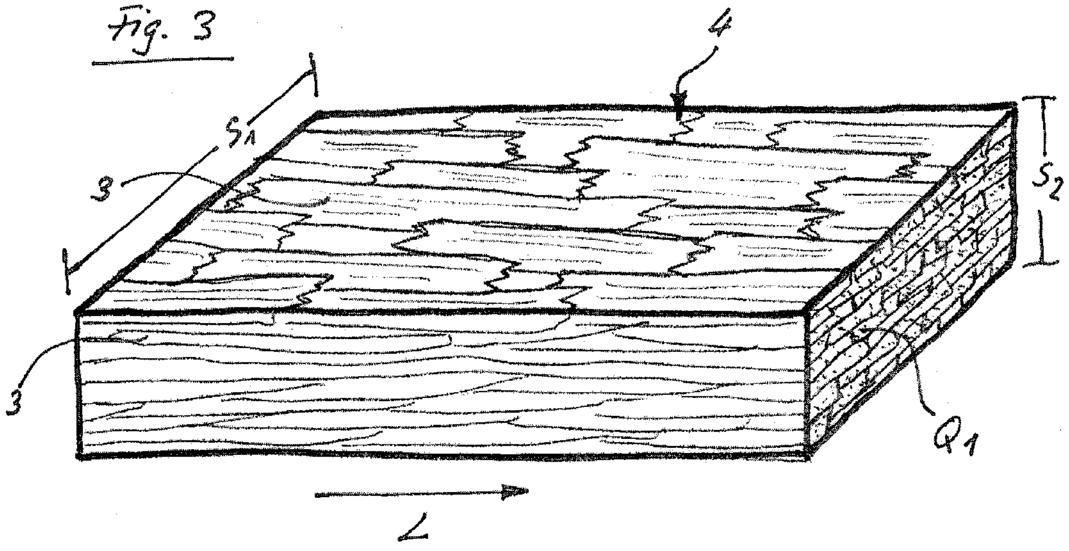
FIG. 3 illustrates an example of a shaped article in the form of a board made of chips which are glued together.

FIG. 3 shows an example of a shaped article in the form of a board (4) made of chips (3) which are glued together. The board has a side edge with a length $S_1$ and a second side edge $S_2$. The grain direction of all the chips (3) lies in the direction of the arrow (L). Thus the arrow (L) also represents the axis of the grain direction. Only two chips (3) are designated by way of example. It becomes clear that the chips (3) lie as closely together as possible. The mutual grain direction of the chips is as far as possible parallel or deviating at most at an angle, as stated above, in the axis in the direction of the arrow (L). The spaces inevitably forming between the irregularly shaped chips are filled with adhesive. The adhesive forms a non-separable connection between the chips. $Q_1$ designates the cross-sectional area or cross-cut wood face of the board. The balsa wood grains are severed transversely at this area.

Figure 4:
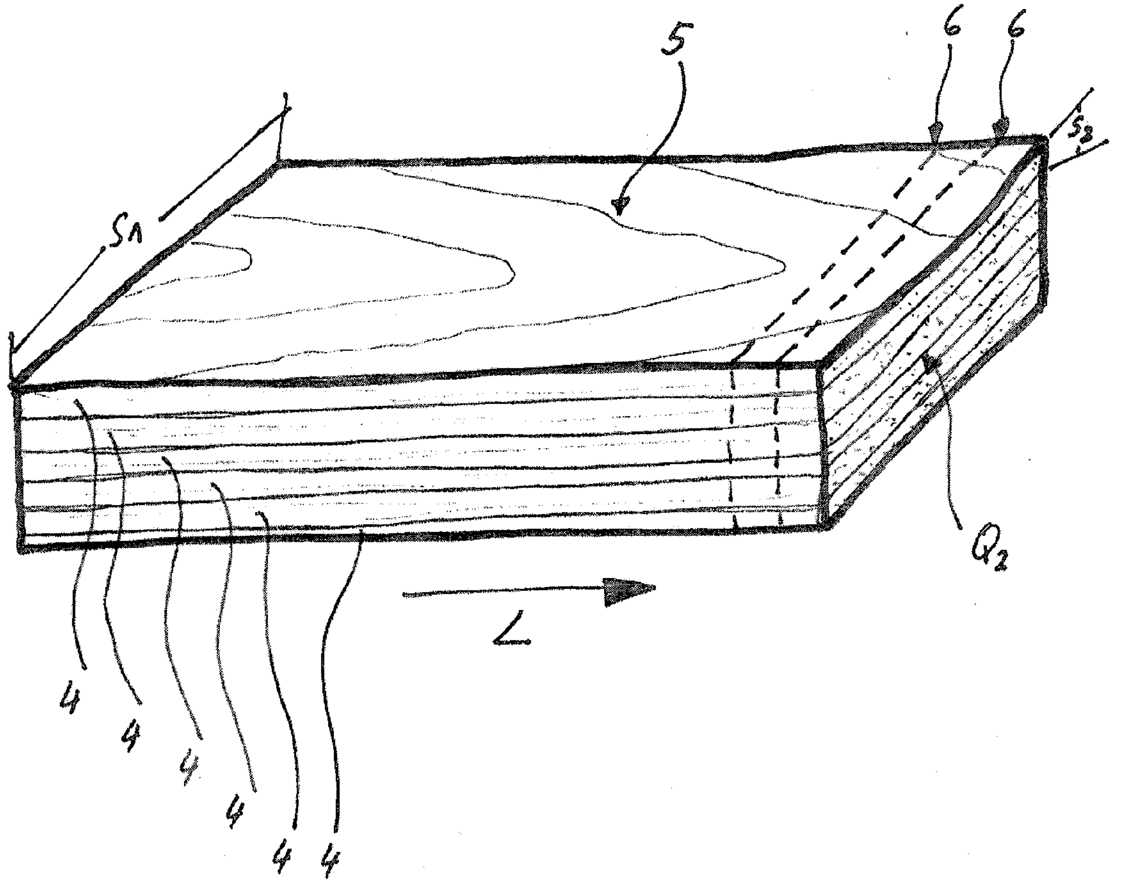
FIG. 4 shows a block made of a large number of shaped articles in the form of panels in a stack.

FIG. 4 shows a block (5) made of a large number of shaped articles in the form of panels (4) in a stack. The panels (4) may in principle also correspond to the board (4) from FIG. 3 but the side edge $S_1$ is substantially increased compared to the second side edge $S_2$, so a panel can be referred to. Instead of the panels (5), veneer panels (4), in individual cases also called wood sheets, peeling veneers or veneers, can be used. The stacked panels (4) are non-separably connected to one another by adhesive. The same adhesive is expediently used, which is used to produce the board or panel. In all the panels (4), the grain direction is oriented along or substantially running in parallel with an axis in the direction of the arrow (L). $Q_2$ designates the cross-sectional area or cross-cut wood face of the block (5). The balsa wood grains are separated transversely at the area $Q_2$. The dashed lines (6) indicate cut or saw lines. The cut lines (6) may have any spacing with respect to one another and the spacing depends, for example, on the purpose of use of the cross-cut wood panel to be separated. The block (5) is accordingly processed into a number of shaped articles, here cross-cut wood panels.

The invention claimed is:

1. An end-grain article containing timbers with a predetermined grain direction for a pressure loading in the grain direction, wherein the timbers consist of balsa chips, balsa strands, balsa strips and/or balsa veneers with a grain direction oriented substantially in the same direction with respect to an ideal grain direction, wherein the ideal grain direction (L) describes that grain direction at which all the balsa chips, balsa strands, balsa strips and/or balsa veneers have the same grain direction, and the grain direction of the individual balsa chips, balsa strands, balsa strips and/or balsa veneers do not differ by more than 30° from the ideal grain direction, and the end-grain article contains foamed adhesive between the balsa chips, balsa strands, balsa strips and/or balsa veneers.

2. An end-grain article according to claim 1, wherein the end-grain article is a beam, a plank or an end-grain panel.

3. An end-grain article according to claim 1, the foamed adhesive of the end-grain article has the same density as that of the balsa chips, balsa strands, balsa strips and/or balsa veneers, or its density differs by a maximum of 20% by weight from the density of the balsa chips, balsa strands, balsa strips and/or balsa veneers.

4. An end-grain article according to claim 1, wherein the end-grain article contains balsa chips which are longitudinal chips or strands with a length of 40 to 400 mm, a width of 4 to 40 mm and a thickness of 0.3 to 2 mm.

5. An end-grain article according to claim 1, wherein the end-grain article contains balsa strips and/or balsa veneers having a length of 50 mm to 2500 mm, a width of 10 mm to 2500 mm and a thickness of 0.3 mm to 30 mm.

6. An end-grain article according to claim 1, wherein the density of the balsa chips, balsa strands, balsa strips and/or balsa veneers is from 0.07 to 0.25 g/cm$^3$.

7. A end-grain article according to claim 1, wherein the grain direction of the individual balsa chips, balsa strands, balsa strips and/or balsa veneers does not differ by more than 0° to 10° from the ideal grain direction (L).

8. A end-grain article according to claim 1, wherein the grain direction of the individual balsa chips, balsa strands, balsa strips and/or balsa veneers does not differ by more than 0° to 3° from the ideal grain direction (L).

9. An end-grain article according to claim 1, wherein the foamed adhesive is a foamed polyurethane-containing adhesive.

10. An end-grain article according to claim 1, wherein the foamed adhesive is contained in the end-grain article in a quantity of 1 to 15% by volume, based on the volume of the end-grain article.

11. An end-grain article according to claim 1, wherein the foamed adhesive is contained in the end-grain article in a quantity of 2 to 10% by volume, based on the volume of the end-grain article.

12. An end-grain article according to claim 1, wherein the foamed adhesive is contained in the end-grain article in a quantity of 3 to 5% by volume, based on the volume of the end-grain article.

13. An end-grain article according to claim 1, wherein the end-grain article is an end-grain panel in which the grain direction of the balsa chips, balsa strands, balsa strips and/or balsa veneers contained therein does not differ by more than 30° from a surface normal to the end-grain panel surface.

14. A method for producing an end-grain article according to claim 1, comprising the steps of mixing balsa chips, balsa strands, balsa strips and/or balsa veneers with adhesive and orienting the balsa chips, balsa strands, balsa strips and/or balsa veneers to run substantially in the same direction with respect to the grain direction, wherein the grain direction of the individual balsa chips, balsa strands, balsa strips and/or balsa veneers does not differ by more than 30° from an ideal grain direction (L), in which all the balsa chips, balsa strands, balsa strips and/or balsa veneers have the same grain direction, activating the adhesive so that with the formation of an adhesive force the balsa chips, balsa strands, balsa strips and/or balsa veneers are solidified to form a shaped article in the form of a panel, a block or a plank, optionally stacking a plurality of shaped articles on one another and gluing the plurality of shaped articles to one another, and severing the resulting shaped article transverse to its ideal grain direction to form a number of end-grain articles.

15. A method according to claim 14, wherein the balsa chips, balsa strands, balsa strips and/or balsa veneers oriented to run in the same direction with respect to the grain direction and mixed with adhesive are solidified in a double belt press to form the shaped article.

16. A method according to claim 14, wherein balsa chips, balsa strands, balsa strips and/or balsa veneers are mixed with adhesive in a quantity of 1 to 15% by volume, based on the volume of the shaped article.

* * * * *